US008979652B1

(12) United States Patent
Ciszewski et al.

(10) Patent No.: US 8,979,652 B1
(45) Date of Patent: Mar. 17, 2015

(54) NATURAL MOVEMENT IN A VIRTUAL ENVIRONMENT

(71) Applicant: TECHLAND Sp. z o.o., Ostrow Wielkopolski (PL)

(72) Inventors: Adrian Tomasz Ciszewski, Wroclaw (PL); Bartosz Andrzej Kulon, Lubawka (PL); Mikolaj Filip Kulikowski, Wroclaw (PL)

(73) Assignee: TECHLAND Sp. z o. o, Ostrow Wielkopolski (PL)

( * ) Notice: Subject to any disclaimer, the term of this patent is extended or adjusted under 35 U.S.C. 154(b) by 0 days.

(21) Appl. No.: 14/228,446

(22) Filed: Mar. 28, 2014

(30) Foreign Application Priority Data

Mar. 27, 2014 (PL) .......................................... 407690

(51) Int. Cl.
  *G06T 13/00* (2011.01)
  *A63F 13/00* (2014.01)
  *A63F 9/24* (2006.01)

(52) U.S. Cl.
  CPC ...................................... *A63F 13/00* (2013.01)
  USPC ................ 463/32; 345/474; 463/30

(58) Field of Classification Search
  None
  See application file for complete search history.

(56) References Cited

U.S. PATENT DOCUMENTS

| 2002/0019257 A1* | 2/2002 | Koizumi et al. ................. 463/32 |
| 2002/0024521 A1* | 2/2002 | Goden ........................... 345/474 |
| 2009/0104990 A1* | 4/2009 | Tsujino et al. .................. 463/32 |
| 2010/0298048 A1* | 11/2010 | Yamazaki ....................... 463/30 |
| 2011/0165939 A1* | 7/2011 | Borst et al. ..................... 463/29 |
| 2012/0115596 A1* | 5/2012 | Otani .............................. 463/30 |

OTHER PUBLICATIONS

Examiner, "'Dying Light' may let players explore the interiors of each building," 2 pages (Feb. 3, 2014), http://www.examiner.com/article/dying-light-may-let-players-explore-the-interiors-of-each-building, retrieved Mar. 27, 2014.
GDCVault, "Creating First Person Movement for Mirror's Edge," 7 pages (Oct. 2009), http://www.gdcvault.com/play/1012172/Creating-First-Person-Movement-for, retrieved Mar. 12, 2014.
Valve, "The AI Systems of Left 4 Dead," 95 pages (2009), http://www.valvesoftware.com/publications/2009/ai_systems_of_l4d_mike_booth.pdf, retrieved Mar. 12, 2014.
Wikipedia, "Descent (video game)", 7 pages, http://en.wikipedia.org/wiki/Descent_(video_game), retrieved Mar. 28, 2014.
Wikipedia, "Pitfall", 1 page, http://en.wikipedia.org/wiki/Pitfall, retrieved Mar. 28, 2014.

(Continued)

*Primary Examiner* — Dmitry Suhol
*Assistant Examiner* — Jason Yen
(74) *Attorney, Agent, or Firm* — Banner & Witcoff, Ltd.

(57) ABSTRACT

Some aspects discussed herein may provide for a dynamic and real-time analysis of a virtual environment around a player as the player traverses the virtual environment. The analysis may determine candidate hooks (interaction points) for player movement in the virtual environment, and a best hook may be selected for performing a movement action. The movement action may be selected based on the selected hook, providing fluid and natural movement through the virtual environment. The candidate hooks may be determined based on a plurality of three dimensional ray traces originating from points along a left side and a right side of the player and at a range of heights. Collision points from the ray traces may be analyzed to determine whether they may support movement interaction, and valid points may be used to create the candidate hooks.

20 Claims, 9 Drawing Sheets

(56) References Cited

OTHER PUBLICATIONS

Wikipedia, "Mirror's Edge", 9 pages, http://en.wikipedia.org/wiki/Mirror's_Edge, retrieved Mar. 28, 2014.

Youtube, "12 minutes of dying light", 2 pages (Aug. 15, 2013), http://www.youtube.com/watch?v=J2TSCZqcjR0, retrieved Mar. 28, 2014.

* cited by examiner

```
/// Perform horizontal traces
foreach rays in (rays_left, rays_right) {
        /// Begin from behind player in Z direction
        start_point = player_pos – offset_dist * player_dir_z;

/// Start ray trace from side of player
        if (rays == rays_left)
                start_point -= player_dir_x * side_dist;
        else /// rays == rays_right
                start_point += player_dir_x * side_dist;

/// Set direction for traces in XZ plane
        dir = player_dir_z;
        dir.y = 0;
        normalize(dir)

/// Perform ray traces
        for (h = player_pos.y + max_height; h > player_pos.y + min_height; h -= step_size) {
                start_point.y = h;
                rays.add( RayTrace(start_point, dir * edge_detect_max) );
        }
}
```

FIG. 6

```
/// RayTrace function – checks if there is a collision with world geometry
/// (returns collision point or NULL)
function RayTrace(origin, dir)
    {
        if (has_collision_with_world_geom(origin, dir))
            return collision_point;
        else
            return NULL;
    }
```

FIG. 7

```
/// Remove invalid collision points / ray traces
foreach rays in (rays_left, rays_right) {
    for (i=0; i < rays.size(); ++i) {
        if (rays[i] != NULL) {
            /// Determine if there is an edge associated with the collision point
            vert_point = RayTrace( rays[i] + up_dir * test_offset_y
                                    + player_dir_z * test_offset_z, down_dir);
            if (vert_point == NULL) {
                rays[i] = NULL;
                continue;
            }
            rays[i].y = vert_point.y;

/// Can player climb?
            can_climb = true;
            for (j=1; j<max_climb && i - j >= 0; ++j) {
                cur_idx = i - j;
                if (rays[cur_idx] is NULL) continue;
                trace_length = DotXZ(rays[cur_idx], rays[i]);
                if (i == 0 || i == 1 && trace_length > small_edge) continue;
                if (trace_length < climb_min_space)
                    can_climb = false;
            }

/// Can player hang?
            can_hang = true;
            for (j=1; j<max_hang && i + j < rays.size(); ++j) {
                cur_idx = i + j;
                if (rays[cur_idx] is NULL) continue;
                trace_length = DotXZ(rays[cur_idx], rays[i]);
                if (trace_length < hang_min_space)
                    can_hang = false;
            } if (!can_climb && !can_hang)
                rays[i] = NULL;
        }
    }
}
```

FIG. 8

```
/// Make hook pairs and select best hook
hooks = []
foreach rl in rays_left {
        if (rl is NULL) continue;

foreach rr in rays_right {
                if (rr is NULL) continue;

/// check rl.collision_point vs. rr.collision_point?
                v = rl - rr;

/// check if the angles are valid for making a hook
                if (angleXY(v) < max_XY_ang && angleYZ(v) < max_YZ_ang) {
                        hook_pos = (rl + rr) * 0.5;

score = (1 - DistanceXZ(player_pos, hook_pos) / dist_factor)
                                        + Dot(player_dir_z, hook_pos - player_pos);

hooks.add(rl, rr, score);
                }
        }
} hooks = sort_hooks_by_score(hooks)

best_hook = hooks[0];
```

FIG. 9

NATURAL MOVEMENT IN A VIRTUAL ENVIRONMENT

This application claims priority to Polish Patent Application No. PL407690, having the title "Natural Movement in a Virtual Environment," filed in Poland on Mar. 27, 2014, by Adrian Ciszewski, et al., herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to computer software and three dimensional virtual environments operating under the control of computer software. More specifically, aspects of the disclosure provide a method of detecting interactive hook points in a virtual environment for a player-character to use during movement within the virtual environment.

BACKGROUND

Software-based virtual environments provide a graphically rendered simulated environment for one or more users to experience. For example, virtual environments have been used to provide fictional gaming environments and have also been used to simulate real world locations or surroundings. Virtual environments may support virtual actions analogous to various real life activities or interactions, such as running through the environment or jumping over obstacles. Typically, a user controls a player character to move through and experience the virtual environment. A client application may present the virtual environment to the user, receive input from the user, and determine how to alter the virtual environment based on that user input.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

An aspect of presenting a virtual environment and enabling user interaction with the environment involves the identification of objects and surfaces within the virtual environment. The virtual environment may use three dimensional geometric elements (geometry) such as surfaces, lines, polygons, textures, shapes, points, and the like to represent objects and structures in the virtual environment. In some previous methods of providing virtual environments, level designers have manually placed interaction hooks throughout the virtual world and manually define how a user can interact with those hooks. However, object geometry included in virtual environments has become more complex over time and collisions with detailed objects prevent the movement of the player throughout the environment or result in unexpected behavior such as where a player travels through an object. Level designers must spend a significant amount of time manually adding hooks throughout the virtual environment to correspond to the geometry of the virtual environment.

To overcome limitations described above, and to overcome other limitations that will be apparent upon reading and understanding the present specification, aspects described herein are directed to providing natural and dynamic movement to a player as the player moves through a virtual environment. Some aspects discussed herein may provide for a dynamic and real-time analysis of geometry in the virtual environment around the player as the player traverses the virtual environment. The analysis may determine candidate hooks for player movement interaction in the virtual environment, and a best hook may be selected for performing a movement action. The movement action may be selected based on the selected hook, providing fluid and natural movement through the virtual environment.

By leveraging various aspects of these techniques and/or other features described in further detail below, an application may provide a user with smooth and natural movement throughout a virtual environment. Interaction hooks may be dynamically detected based on geometry and objects in the virtual environment, and a suitable action may be selected based on the available hooks. Aspects described herein may overcome increasing complexity in virtual worlds and provider a greater freedom of movement to players in the virtual environment.

Thus, in some embodiments discussed further below, a method may be provided allowing natural movement in a virtual environment. The method may determine a set of movement hooks in a virtual environment as a player moves through the virtual environment. The method may select one of the hooks based at least in part on a distance from the player to the hook. The method may animate the player to perform a first action relative to an object associated with the selected hook. The first action may be selected from a plurality of different actions, and the first action may be selected based at least in part on a height of the selected hook.

In some embodiments, determining the set of movement hooks in the virtual environment may include performing a plurality of three dimensional ray traces from a left side of the player and from a right side of the player, thereby generating left side collision points and right side collision points. Invalid points may be removed from the left side collision points and the right side collision points based on one or more interaction constraints. The remaining left side collision points may be paired with one or more right side collision points based on an angle of a line between the two points, thereby generating a set of candidate movement hooks.

In some embodiments, the interaction constraints may be based at least in part on the plurality of different actions. In some embodiments, removing the invalid points may comprise determining whether a collision point is associated with a potential edge in the virtual environment by performing a vertical ray trace from a point above the particular collision point in a downward direction. Removing the invalid points may further comprise determining whether the player can climb or hang at the collision point based on a minimum climbable space above the point or a minimum hang space below the point.

In some embodiments, the selected hook of the set of movement hooks may be selected based on determining a hook score for each respective hook based at least in part on a distance from the player to the respective hook. The hook with the highest hook score may be selected. In some embodiments, the first action may be selected based on a jump height attribute associated with the player. The first action may include jumping at least as high as the object associated with the selected hook. The first action may include climbing the object or hanging from the object in the virtual environment. The first action may be selected based on determining an available height above the selected hook. The available height may be compared to a threshold and a climb action may be selected where the available height is above the threshold. A hang action may be selected where the available height is less than the threshold.

In some embodiments discussed below, a method of generating a set of movement hooks in a virtual environment may be provided. The method may include performing a plurality of three dimensional ray traces from a left side of the player and from a right side of the player to generate left side collision points and right side collision points. The method may include removing invalid points from the left side collision points and the right side collision points based on one or more interaction constraints. The method may include generating the set of movement hooks by determining compatible pairs of the left side collision points and the right side collision points based on an angle between the two points. The method may include selecting a first hook of the set of movement hooks based on a hook score of the first hook and animating the player to perform a movement action relative to an object associated with the selected hook.

In some embodiments, the plurality of three dimensional ray traces may comprise horizontal ray traces originating from left origin points on the left side of the player and right origin points on the right side of the player. The left origin points and the right origin points may be distributed over a range of heights based on the position of the player. The ray traces may be performed in a direction associated with a movement direction of the player. In some embodiments, removing the invalid points may comprise determining that a particular collision point is an invalid point by performing a vertical ray trace from an origin point above the particular collision point in a downward direction.

In some embodiments, the hook score may be based at least in part on a travel speed attribute associated with the player or an angle between a movement direction of the player and a direction from the player to the first hook. In some embodiments, animating the player to perform the movement action may be done in response to receiving user input from a user controlling the player in the virtual environment. In some embodiments, the movement action may be a wall jump or a wall run on a wall associated with the selected hook.

In some embodiments, a non-transitory computer-readable media may contain instructions that cause a computing device to perform a method including detecting a set of movement hooks in a virtual environment as a player moves through the virtual environment. Detecting the set of movement hooks may be based on the geometry of the virtual environment. The method may include selecting a hook of the set of movement hooks as a selected hook based at least in part on a distance from the player to selected hook. The method may include animating the player to perform a movement action relative to an object associated with the selected hook. Detecting the set of movement hooks may include performing a plurality of horizontal three dimensional ray traces from a left side of the player and from a right side of the player to generate left and right side collision points. Invalid points may be removed from the left and right side collision points based on one or more interaction constraints. The computing device may generate the set of movement hooks by determining compatible points of the left side collision points and the right side collision points based on an angle between the two points.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 6-9 depict example computer code in accordance with one or more illustrative aspects discussed herein.

DETAILED DESCRIPTION

Figure 1:
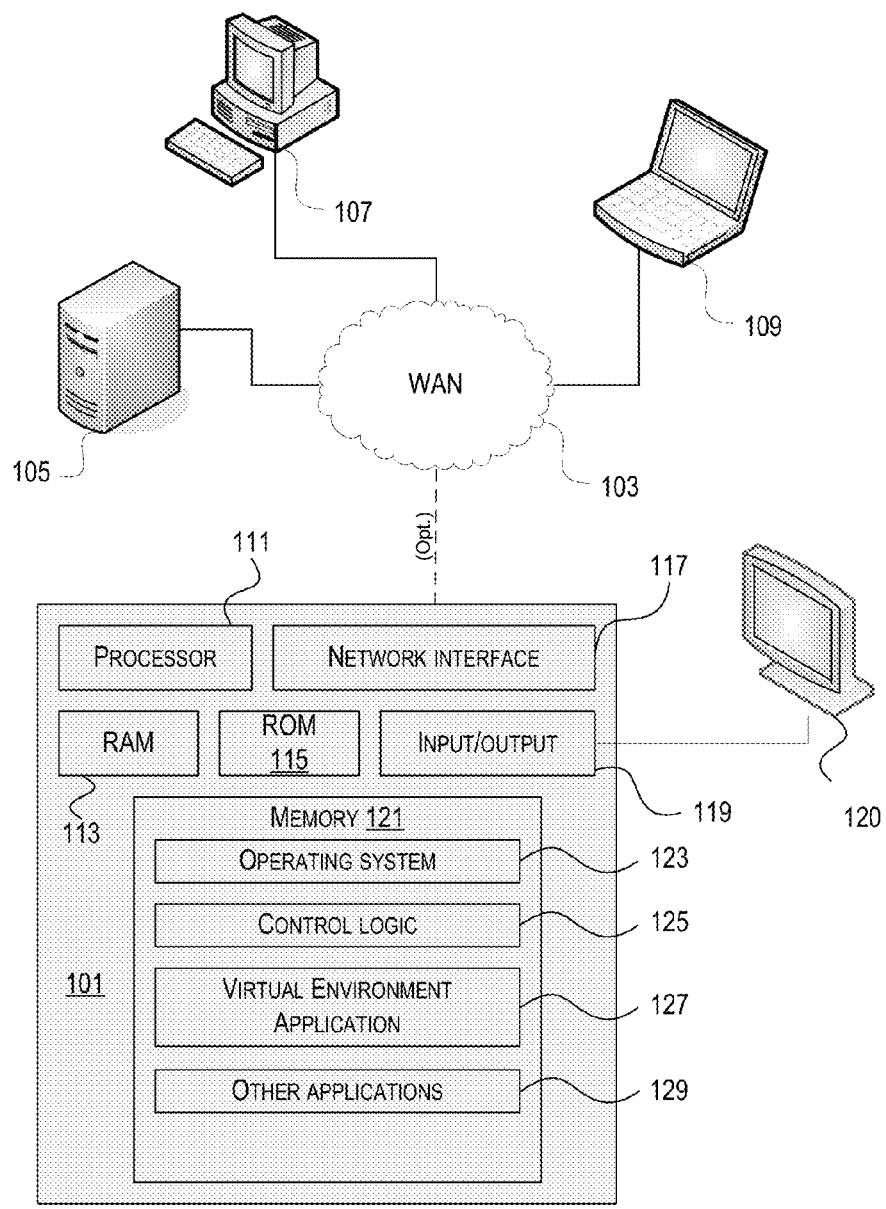
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for providing natural and dynamic movement to a player as the player moves through a virtual environment. Virtual environments may be used to provide a user with a simulated world for interaction and exploration. Some examples of virtual environments include fictional video game settings and simulations of real life environments. A computing device, such as a personal computer, may generate the virtual environment and may provide it to a user. A user may control the player to navigate and explore the virtual environment. The user may control the player to run, jump, and climb their way through the virtual environment. The player may, for example, jump off of, land on, or climb objects in the virtual world based on interaction rules and interaction points (hooks) associated with the objects. Faced with a structure in the virtual environment, for example, a player may jump through an open window, hang from a roof overhang, or slide under a low hanging pipe. However, virtual environments are increasingly complex and contain tens of thousands of objects and other geometry to present a rich and engaging virtual environment. Manually encoding every edge or hook available in the virtual environment is a tedious, if not impossible, task. Instead, some aspects discussed herein may provide for a dynamic and real-time analysis of geometry in the virtual environment around the player as the player traverses the virtual environment. The analysis may determine candidate hooks based on the analysis of the geometry for player movement interaction in the virtual environment, and a best hook may be selected for performing a movement action. The movement action may be selected based on the selected hook, providing fluid and natural movement through the virtual environment. Before discussing these concepts in greater details, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device. In some embodiments, computing device 101 may be a video game console or other computing device configured to generate and/or present a virtual environment to a user.

Computing device 101 may, in some embodiments, operate in a standalone environment. In others, computing device 101 may operate in a networked environment. As shown in FIG. 1, various network nodes 101, 105, 107, and 109 may be interconnected via a wide area network (WAN) 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, game controller, display, printer, etc.), and memory 121. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, virtual environment application software 127 for generating and/or presenting a virtual environment to the user according to techniques discussed further herein, and other applications 129. Control logic 125 may be incorporated in and may be a part of virtual environment application 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
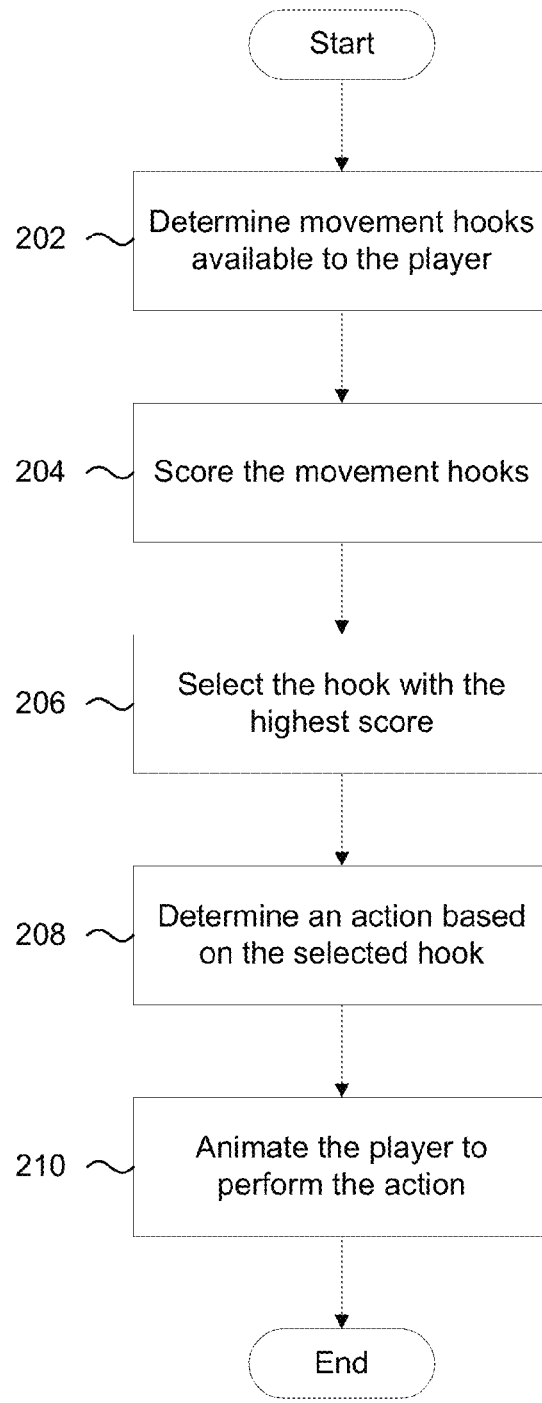
FIG. 2 depicts a flowchart that illustrates a method of selecting a hook for animating an action of a player character in accordance with one or more illustrative aspects discussed herein.

Having discussed several examples of computing devices which may be used to implement some aspects as discussed further below, discussion will now turn to a method for providing movement in a virtual environment as illustrated in FIG. 2.

FIG. 2 illustrates a method for providing movement in a virtual environment as a player moves throughout the virtual environment. The virtual environment may be provided, for example, by computing device 101. As discussed above, a user of the virtual environment may control a player character moving throughout the virtual environment. The player character may interact with objects in the virtual environment similar to interactions in a physical, real world environment. A user of the virtual environment may expect that objects in the virtual environment behave similarly to physical analogues, and some aspects described herein may allow interactions with the virtual environment to better match the user's expectations based on his or her experience in the real world.

According to some aspects disclosed herein, natural and dynamic movement may provide a user of a virtual environment with enhanced interaction and an improved experience. Natural movement may allow the user to control the player character freely throughout the virtual environment. In some embodiments, natural movement techniques may be similar to "parkour" or "free running," where an athlete traverses a challenging environment by running, leaping and climbing their way through a wide range of obstacles. For example, as the player moves down a street, the player may come across a low hanging balcony. Using natural movement, the application providing the virtual environment may dynamically determine that the player may climb a ledge of the balcony as the player approaches. When the user provides input to jump, the player may leap up to the balcony and pull themselves up and gain access to a new portion of the virtual environment.

In step 202, computing device 101 may detect one or more hooks available in relation to the player character in the virtual environment. Hooks may correspond to edges in the virtual environment which are available for movement interaction. In some embodiments, a hook or edge may be defined using two points in the virtual environment. In others, a hook may be associated with a single point in the virtual environment. In still others, a hook may be defined using more than two points in the virtual environment. The hooks or edges may be associated with one or more objects, and may be associated with the top of an object, a side of the object, a deformity or feature of the object, or any part of the object. For example, a hook may be a top side of a wall, a window sill, an edge of a crate, a hole in a wall, a side of a boulder, a tree limb, and/or any other edge determined to be available for movement interaction based on the geometry associated with the object. The geometry associated with the object may include one or more surfaces, lines, polygons, textures, shapes, points, and the like used to represent the object or structure in the virtual environment. The hooks may be any edge deemed suitable for movement interaction in accordance with one or more aspects as disclosed herein. The hooks may be any edge in the virtual environment that the player character may use to traverse or otherwise move through the virtual environment, and may be based on one or more interaction constraints associated with the virtual environment, player, application, or user. As an example, a player may be running at a wall with a crate against the wall and a ledge above the crate. In this scenario, the hooks available for movement interaction may include the top edge of the crate nearest the player and an edge of the ledge on the wall.

The hooks may be detected dynamically, as the player moves throughout the virtual environment. The application may examine geometry in the virtual environment around the player to determine hooks available to the player based on their location in the virtual environment. In some embodiments, determining hooks in the virtual environment may comprise identifying collision points on objects and determining whether the collision point may support movement interaction by the player. Collision points that do support movement interaction may be paired up to define a set of candidate hooks. For example, a ledge may, in isolation, represent something the player could grab and hang from. However, if there is an obstruction below the ledge, the ledge may not be suitable for hanging. Detection and validation of hooks as the player moves through the virtual environment is described further in FIG. 3, discussed below.

In step 204, each of the detected hooks may be analyzed and a hook score may be computed for each hook. In some embodiments, the hook score may be based on a distance from the player to the center of the hook. For example, a hook that is closer to the player may have a higher hook score. Other factors may be used in determining a hook score. In some embodiments, a player's speed in the virtual environment may be used to determine a hook score. In some embodiments, an angle between a player's movement direction and a direction from the player to the hook may be used. For example, a hook located close to the direction the player is heading may have a high hook score, and unsteady hooks may have a higher hook score when a player is travelling slowly. In some embodiments, the hook score may be based on attributes of the virtual environment, objects associated with the hook, objects nearby the hook, other hooks, the player character, the user, the application, or any other suitable criteria for determining a hook score for a hook in the virtual environment. In some embodiments, a hook may have different hook scores for different types of interaction. For example, a hook may have a high score for hanging but a low score for climbing on top of the hook or for using a climbing rope or grappling hook.

In step 206, the hook having the highest hook score may be selected for interaction. In some embodiments, the hook may be selected in response to user input initiating a movement interaction. In some embodiments, a threshold hook score may be used and other criteria may determine which hook is selected of the hooks satisfying the threshold hook score. The hook may be selected based on the type of movement interaction supported by the hook. For example, if a user indicates a free running action or other natural movement interaction, a nearby hook supporting the player's movement may be selected. If the user indicates a different type of interaction, such as a climbing rope or grappling hook, a different hook may be selected based on its suitability as a point of interaction for that particular mode of interaction.

In step 208, the application may determine an action to perform based on the selected hook. In some embodiments, the action may be determined based on receiving user input initiating a movement interaction. In some embodiments, the user input may be used as part of determining which action to perform. In others, the user input may simply signal that the application should determine an action. The action may be selected from a plurality of movement actions supported by the virtual environment and/or player character. Examples of movement actions include walk, run, jump, crouch, crawl, kneel, roll, slide, climb, hang, hurdle, push, pull, grab, punch, kick, and the like. The action may be selected based on one or more attributes of the selected hook. In some embodiments, the action may be selected based on a height of the selected hook relative to a current height of the player's location. For example, a selected hook may be above the player. Where the selected hook is lower than a jump height of the player, such as 1.5 meters above the player, the application may determine that the "jump" action be selected and the player will jump over or onto an object associated with the hook. Where the hook is above the player's jump height, but within a reach height of the player (which may include the jump height), the application may determine that a "climb" or "hang" action may be appropriate. In such a case, the application may determine whether there is an available minimum climb space above an object associated with the hook, such as 1.6 meters of space above the object. If there is space to climb above the hook, the application may select the "climb" action. If there is not space to climb above the hook, the application may then select the "hang" action.

In step 210, the application may determine the appropriate animation for animating the player character to perform the selected action. For example, if it was determined in step 208 that the player should jump over the selected hook, the player in the virtual environment may be animated to show the player jumping off the ground, over an object associated with the hook, and landing on the other side of the object. As another example, if the hook were above a jump height of the player and the application determined in step 208 that the player should climb the selected hook, the player in the virtual environment may be animated to show the player jumping off the ground, grabbing onto the edge of the object associated with the hook, pulling themselves up, and standing on top of the object. In some embodiments, the animation may be selected based on the selected hook, the player, attributes of the player, an object associated with the hook, objects associated with the player's location, objects between or around the player or the hook, other hooks, user input, previous animation status, or any other criteria for choosing an animation to show the player performing a selected action.

In some embodiments, additional hooks may be determined during the animation and used to continue the movement action. For example, if the selected action is to jump on top of a crate, the application may detect hooks available from the player's new location on top of the crate. In this example, the application may determine that another nearby crate provides a hook for a continued movement action and the application may animate the player to fluidly continue the action by jumping again to the nearby crate. This may continue further, such as where the nearby crate provides the player with access to a roof top. As another example, when a player is hanging from a hook, the application may analyze the geometry of the virtual environment to determine other nearby hooks that the player may move to while hanging. Thus, candidate hooks may continue to be determined as the action is performed and the player may be animated to perform a series of actions using multiple objects to traverse the virtual environment.

Such dynamic analysis of hook points as a player moves through a virtual environment may provide the player with fluid and natural movement in the virtual environment. Real-time analysis of the interaction points available to a player and/or what action should be performed for a selected hook may provide a user with freedom to move a player character through the virtual environment and may provide a more engaging or exciting user experience.

Figure 3:
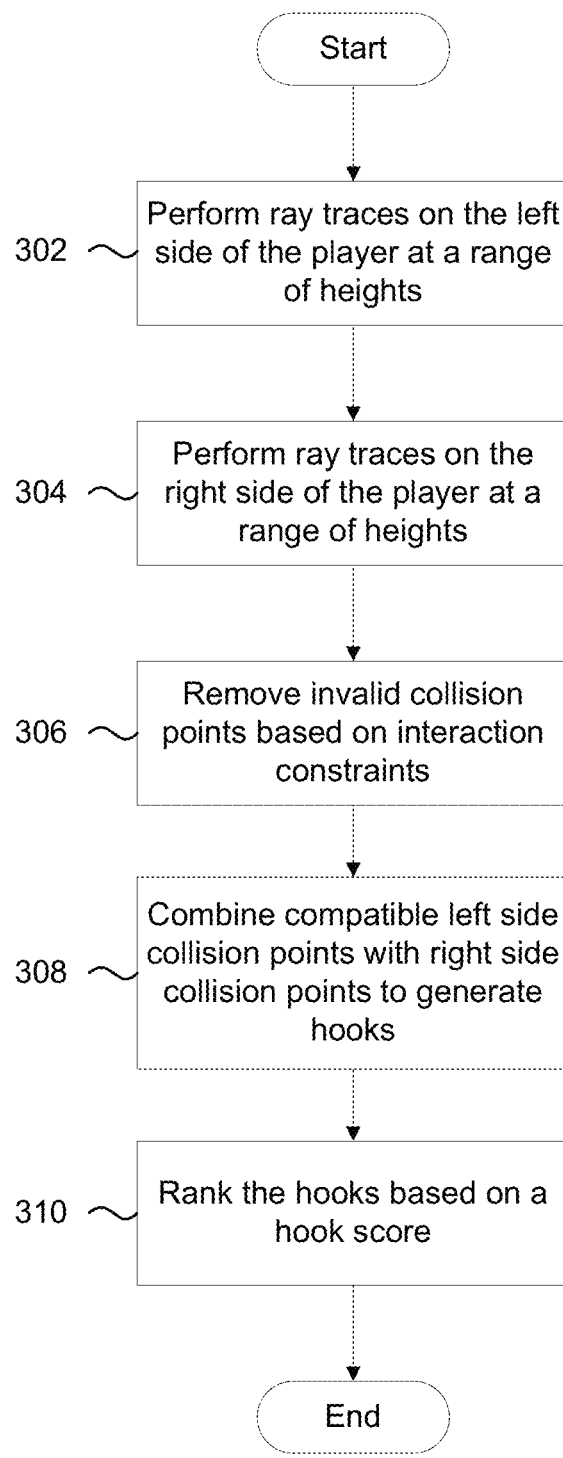
FIG. 3 depicts a flowchart that illustrates a method of determining hooks in a virtual environment in accordance with one or more illustrative aspects discussed herein.

Having discussed a method of providing natural and dynamic movement in a virtual environment, discussion will now turn to FIG. 3 which illustrates one method for determining available movement hooks in a virtual environment.

FIG. 3 illustrates a method of detecting and identifying movement hooks in the virtual environment. The method illustrated in FIG. 3 may be used, for example, to dynamically determine hooks in a virtual environment as a player moves throughout the virtual environment. Geometry around the player may be analyzed to determine whether it contains edges which may be used by the player to traverse the virtual environment using a movement action as described above in FIG. 2. As the player moves through the virtual environment, objects and geometry making up the virtual environment may be analyzed in real-time to determine movement hooks available for the player to traverse the virtual environment. FIG. 3 illustrates one technique for identifying these hooks using ray tracing and interaction constraints to identify candidate movement hooks around the player.

Ray tracing is a technique used in three dimensional virtual environments for a variety of purposes, such as determining collisions with objects in the virtual environment. A ray trace begins at a specified point and proceeds in a specified direction to detect any collisions with objects in the virtual environment. A ray trace may be limited to a specified distance away from the specified point. In the three dimensional virtual environment, an (x,y,z) coordinate set may be used to identify points in the virtual environment. For ease of reference, the (x,y,z) coordinate space may be defined relative to the player. In some embodiments, the coordinate space may have an origin point located at the player's location. For example, the point (0,0,0) may identify the center point of the player-character. The x dimension may be perpendicular to a movement or look direction of the player, extending to the left and the right sides of the player. The z dimension may be parallel to the movement or look direction of the player, ahead of or behind the player. The y dimension may be a height in the virtual world, above and below the player.

In step 302, an application providing the virtual environment may perform a plurality of ray traces on the left side of the player to determine left side collision points. The plurality of ray traces may be used to determine whether object collision points exist in front of the user on a left side of the player. In some embodiments, the ray traces may begin at a location to the left of the player. The starting points of the plurality of ray traces in the XZ plane may be offset in the x direction to the player's left side, and may be offset in the z direction to be behind the player. The plurality of ray traces may correspond to a plurality of heights ranging from the player's maximum reach height to the player's current location height. A minimum step size may be used to iterate over the heights in the range, and a ray trace may be performed at each point in the height range. The ray traces may be performed in the XZ plane at the respective heights, or the ray traces may be performed in the direction the player is looking and/or the direction the player is moving. Thus, a plurality of ray traces may be performed from the left side of the player over the range of accessible heights. Each ray trace may return a collision point where the ray collided with objects or geometry in the virtual environment. In some embodiments, a maximum edge detection distance may be used, and the ray trace may return NULL where no collision was detected within the maximum edge detection distance.

In step 304, the application may perform a plurality of ray traces on the right side of the player to determine right side collision points. Similar to the left side ray tracing of step 302, the starting points of the plurality of ray traces in the XZ plane may be offset in the x direction to the player's right side and may be offset in the z direction to be behind the player. The right side ray tracing may be performed over the same range of heights as the left side ray tracing. The ray traces may be performed in the XZ plane at the respective heights, or the ray traces may be performed in the direction the player is looking and/or the direction the player is moving. Thus, a plurality of ray traces may be performed from the right side of the player over the range of accessible heights. Each ray trace may return a collision point where the ray collided with objects or geometry in the virtual environment. In some embodiments, a maximum edge detection distance may be used, and the ray trace may return NULL where no collision was detected within the maximum edge detection distance. In some embodiments, the right side ray traces may be performed before the left side ray traces without departing from the techniques disclosed herein.

In step 306, the application may remove invalid collision points returned by the left side ray traces and the right side ray traces. Although step 306 is illustrated after steps 302 and 304, in some embodiments step 306 may be performed after step 302 for the left side ray traces and again after step 304 for the right side ray traces. Each of the collision points returned by the ray tracing of steps 302 and 304 may be analyzed using one or more interaction constraints. The interaction constraints may be used to specify characteristics or attributes which indicate that the collision point may support movement interaction. The interaction constraints may comprise tests or criteria for determining whether a collision point supports movement.

One interaction constraint which may be used in some embodiments to determine whether a collision point supports movement interaction is edge detection. In some embodiments, a test may be used to determine whether a surface is available around the collision point for a player to interact with. For example, where the collision point is a side of a box, the edge detection test may detect a top surface of the box as a suitable candidate edge. In some embodiments, edge detection may be performed by a vertical ray trace in a downward direction from a point above and beyond the collision point. In the (x,y,z) space, the vertical ray trace may originate from a point having the same x coordinate, with a more distant z coordinate and a higher y coordinate than the collision point. For example, the origin point for the vertical ray trace may be determined by increasing the z coordinate of the collision point by a small offset value such as 5 cm and by increasing the y coordinate by another offset value such as 10 cm. In some embodiments the y offset value may be less than a minimum step height used to iterate over the range of heights in the left and right side ray traces. The vertical ray trace may be performed in the YZ plane, and may be performed in a downward direction (relative to the y dimension). The vertical ray trace may use a maximum distance equal to or based on the y coordinate offset used to calculate the origin point for the vertical ray trace.

If the vertical ray trace identifies a collision with world geometry, the initial left or ride side collision point may be a candidate edge. If the vertical ray trace does not identify a collision with an object or geometry, the left or right collision point may not be associated with an edge and may be removed from the set of candidate left or right collision points. Where a collision is identified by the vertical ray trace, the y coordinate of the left or right collision point may be adjusted to the y coordinate of the vertical ray trace collision, as the vertical ray trace identifies the actual edge of the object or geometry. Vertical ray tracing is illustrated in FIG. 4B and described further below.

As a result of vertical ray tracing, in some embodiments, the application may determine whether a collision point is associated with an edge in the virtual world. For example, a player may be facing a wall. The left and right ray traces may detect collision points along both sides up to the top of the wall. Vertical ray tracing may be used to eliminate many of the collision points along the wall other than those associated with the top edge of the wall or other geometric features of the wall. For example, a first collision point in the middle of the wall with a generally flat surface above and below might not satisfy the vertical ray tracing test. The downward ray from an origin point above and further away from the first collision point might not collide with any edge, object, or geometry. The vertical ray trace might return no collision as it travels inside the wall without colliding with any other geometry. However, a second collision point near the top of the wall may satisfy the vertical ray tracing test, as a vertical ray trace based on the second collision point may detect the collision with the top of the wall. As a result, the application may determine that the second collision point at the top of the wall is suitable for movement interaction. The height (y coordinate value) of the second collision point may be adjusted to match the height of the vertical ray trace collision point, thereby more accurately identifying the edge at the top of the wall.

Other interaction constraints may also be used to determine whether a collision point determined by the left and right side ray traces supports movement interaction. In some embodiments, one interaction constraint may be whether the collision point supports climbing. Determining whether a player can climb the collision point may be based on whether there is a minimum amount of space available above the collision point. For example, in some embodiments the application may determine whether there is a minimum climbable space above a candidate collision point that was determined to be a potential edge by the vertical ray tracing. In some embodiments, the available climbing space above the edge may be determined using other results of the left or right ray tracing. For example, the ray traces corresponding to the same side of the player and over a range of heights above the candidate collision point may be used. The application may determine whether the space above the candidate collision point is deep enough for the player to stand on the edge and whether the available space is high enough for the player to climb into the space. This may be done, in some embodiments, by measuring a difference in depth between the ray to the candidate collision point and the rays above the collision point. Where there is a sufficient depth available, for example more than 80 cm, for a minimum height above the candidate collision point, for example more than 1.2 m, the application may determine that the candidate collision point is climbable. If any ray within the range above the candidate collision point does not contain sufficient depth, the application may determine that the candidate collision point is not climbable.

Another interaction constraint which may be used to determine whether a collision point supports movement interaction is whether the collision point supports hanging. Determining whether a player can hang from the collision point may be based on whether there is a minimum amount of space available below the collision point. The determination may be made similarly to determining whether the player can climb the collision point, as described above. For example, in some embodiments the application may determine whether there is a minimum hang space below a candidate collision point that was determined to be an edge by vertical ray tracing. As with determining whether the play can climb a collision point, the application may use the results of the left or right ray traces to determine whether a minimum depth, for example more than 40 cm, is available for a minimum height below the candidate collision point, for example 60 cm. Where there is a minimum depth and height available below the candidate collision point, the application may determine that the collision point supports hanging. If any ray within the minimum height range below the candidate collision point has less than the minimum depth, the application may determine that the collision point does not support hanging.

Still further interaction constraints may be used to determine whether collision points detected by the left and right ray tracing support movement interaction. Interaction constraints may be based on one or more actions supported by the virtual environment, the player, and/or the application. For example, one or more of the interaction constraints may be based on actions such as walk, run, jump, crouch, crawl, kneel, roll, slide, climb, hang, hurdle, push, pull, grab, punch, kick, and the like.

Left side collision points determined by the left side ray tracing and right side collision points determined by the right side ray tracing may be validated and filtered based on the one or more interaction constraints. For example, a collision point may be removed from the list of candidates if the vertical ray tracing does not collide with an edge associated with the collision point. In some embodiments, collision points which are identified as associated with an edge may be removed if they do not support climbing and/or hanging. In one embodiment, a collision point may be removed if it does not support at least one of climbing or hanging. As a result of step 306, the set of left side collision points and the set of right side collision points may be reduced to include those collision points which support movement interaction based on the one or more interaction constraints.

Continuing with FIG. 3, in step 308 compatible left side collision points may be combined with compatible right side collision points to generate one or more hook pairs. The hook pairs may define hooks available for the player to interact with and may correspond to edges or surfaces in the virtual environment. A left side collision point may be paired with one or more right side collision points based on compatibility criteria. In some embodiments, the compatibility criteria may include a minimum and/or a maximum permissible angle of a line drawn between the two points. The compatibility criteria may include different minimum or maximum angles for different planes in the coordinate system. For example, in one embodiment, a left collision point may be compatible with a right collision point where an angle between the two points in the XY plane is less than a maximum angle, such as 27 degrees. In a similar example, a left collision point may compatible with a right collision point where an angle between the two points in the YZ plane is less than a maximum angle, 70 degrees. In other embodiments, additional or other compatibility criteria may be used to determine whether a left side collision point is compatible with a right side collision point. For example, the application may detect whether there are any objects or geometry obstructing a line between the two points. As a result of step 308, a set of candidate movement hooks may be generated from the left side collision points and the right side collision points.

In step 310, the application may determine a hook score for each of the candidate movement hooks. In some embodiments, a hook score may be determined for a movement hook when the left side collision point of the hook is determined to be compatible with the right side collision point as part of step 308. In other embodiments, the hook scores may be determined after the set of movement hooks is generated. As discussed above, the hook scores may be based at least in part on a distance from a center of the hook to the player's location. Hooks that are closer to the player may have a higher hook score. The hook score may be based on an angle between a movement direction of the player and a direction from the player to the center of the hook. Hooks in a direction closer to the player's movement direction may have a higher hook score. The hook score may be based on an action type associated with the virtual environment, the player, and/or user input. The candidate movement hooks may be sorted or ranked based on the hook scores. The application may select a hook of the candidate movement hooks based on the hook scores, for example, as illustrated in FIG. 2.

Figure 4A:
FIGS. 4A and 4B depict an example simplified virtual environment illustrating ray traces in accordance with one or more illustrative aspects discussed herein.
Figure 4B:
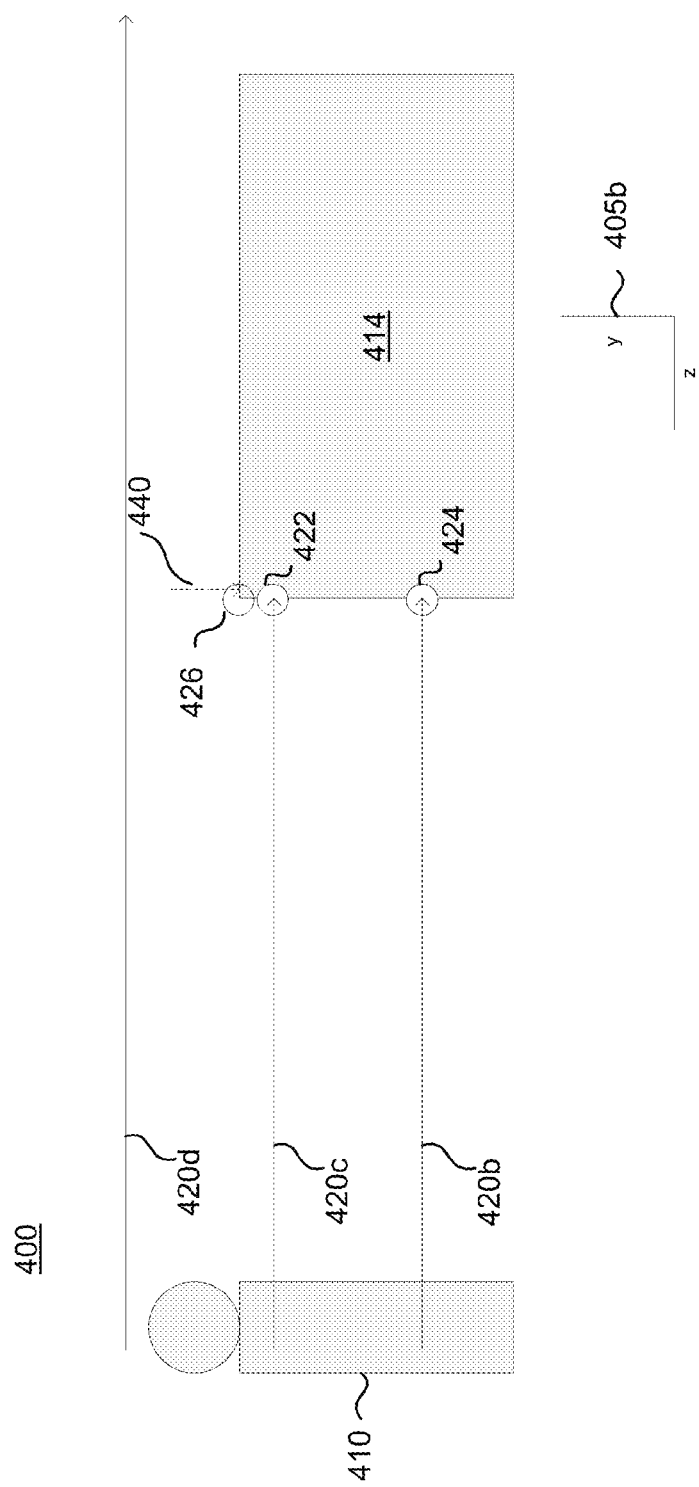

Having discussed methods of providing natural and dynamic movement through a virtual environment in accordance with some aspects disclosed herein, discussion will now turn to an illustrative example of how some of these aspects may be used in a simplified virtual environment, as shown in FIGS. 4A and 4B.

FIG. 4A illustrates an example of a simplified virtual environment 400. Virtual environment 400 is illustrated with a (x,y,z) coordinate system 405a. Player 410 is moving through virtual environment 400 in a movement direction 412. Player 410 may be a player character controlled by a user of an application presenting virtual environment 400. An object in virtual environment 400, such as a large boulder or a collapsed building, may be represented by front surface 414 and top surface 416.

As player 410 moves through virtual environment 400, the application presenting virtual environment 400 may dynamically and/or continuously detect available movement hooks as described above in FIGS. 2 and 3. As described in steps 302 and 304 of FIG. 3, the application may use a plurality of ray traces on a left side of the user and on a right side of the user to detect and identify potential left and right sides of movement hooks. FIG. 4 illustrates left side ray traces 430a-430f and right side ray traces 420a-420f. As described above, these ray traces may originate along a range of heights on both a left side and a right side of player 410. The ray traces, such as ray trace 420c, may be used to determine collision points in front of the player. In some embodiments, the ray traces may be performed in player movement direction 412 or a look direction of player 410. As illustrated in FIG. 4, ray trace 420b has a collision point 424 at front surface 414, and ray trace 420c has a collision point 422 at front surface 414. Ray traces 420a and 430a-430d also collide with front surface 414. Ray traces 420d-f and 430e-f, for example, do not collide with any geometry within an edge detection maximum distance and return a NULL value as a collision point.

For each detected collision point on the left or right side of player 410, the application may determine whether the collision point supports movement interaction using one or more interaction constraints, as described above regarding step 306 of FIG. 3. For example, a vertical ray trace 440 may be executed to test whether collision point 422 is associated with an edge in virtual environment 400. Vertical ray trace 440 may collide with top surface 416 and the application may determine that collision point 422 supports movement interaction. A vertical ray trace executed to test collision point 424 may trace a space inside the object and may not collide with a surface. Accordingly, collision point 424 may be removed from the set of candidate points. Based on vertical ray trace 440, the application may adjust a y coordinate of collision point 422 to match the collision location of vertical ray trace 440 with top surface 416, thereby generating adjusted collision point 426 which may more accurately identify the edge in the virtual world.

As part of analyzing collision point 422, the application may determine whether collision point 422 supports climbing and hanging. The application may determine that collision point 422 does support climbing since ray traces 420d-f indicate a NULL collision and thus there may be sufficient space above the edge for the player to climb. The application may determine that collision point 422 does not support hanging since ray trace 420b collides with front surface 414 at a same depth or if, for example, a ray trace lower than ray trace 420a indicated a collision point obstructing a hang space below collision point 422.

As described above, the application may then generate a set of candidate movement hooks by pairing compatible left side collision points with compatible right side collision points. For example, both left side collision point 432 and right side collision point 422 may be determined to represent edges in virtual environment 400. Based on an angle of a line drawn between collision point 432 and collision point 422, the two points may be determined to be compatible and a candidate hook may be generated and scored.

FIG. 4B illustrates a side view of the scene illustrated in FIG. 4A. Some portions of FIG. 4A have been omitted for clarity. In FIG. 4B, virtual environment 400 is illustrated along the (y,z) coordinate plane 405b. Right side ray traces 420b, 420c, and 420d are illustrated along a right side of player 410. Ray traces 420b and 420c collide with the object associated with surface 414 at collision points 424 and 422, respectively. In determining whether collision point 422 represents an edge in virtual environment 400 that supports movement interaction, the application presenting virtual environment 400 may execute vertical ray trace 440. As can be seen in FIG. 4B, vertical ray trace 440 may originate from a point further away from player 410 (positive z offset) and above collision point 422 (positive y offset). In some embodiments, the y offset used to determine the origination point for vertical ray trace 440 may be based on a step size used in generating ray traces 420a-420f. Vertical ray trace 440 may collide with a top surface of the object and the application may determine that collision point 422 represent an edge in the virtual world. The application may adjust a y coordinate of collision point 422 based on vertical ray trace 440, resulting in adjusted collision point 426.

Figure 5:
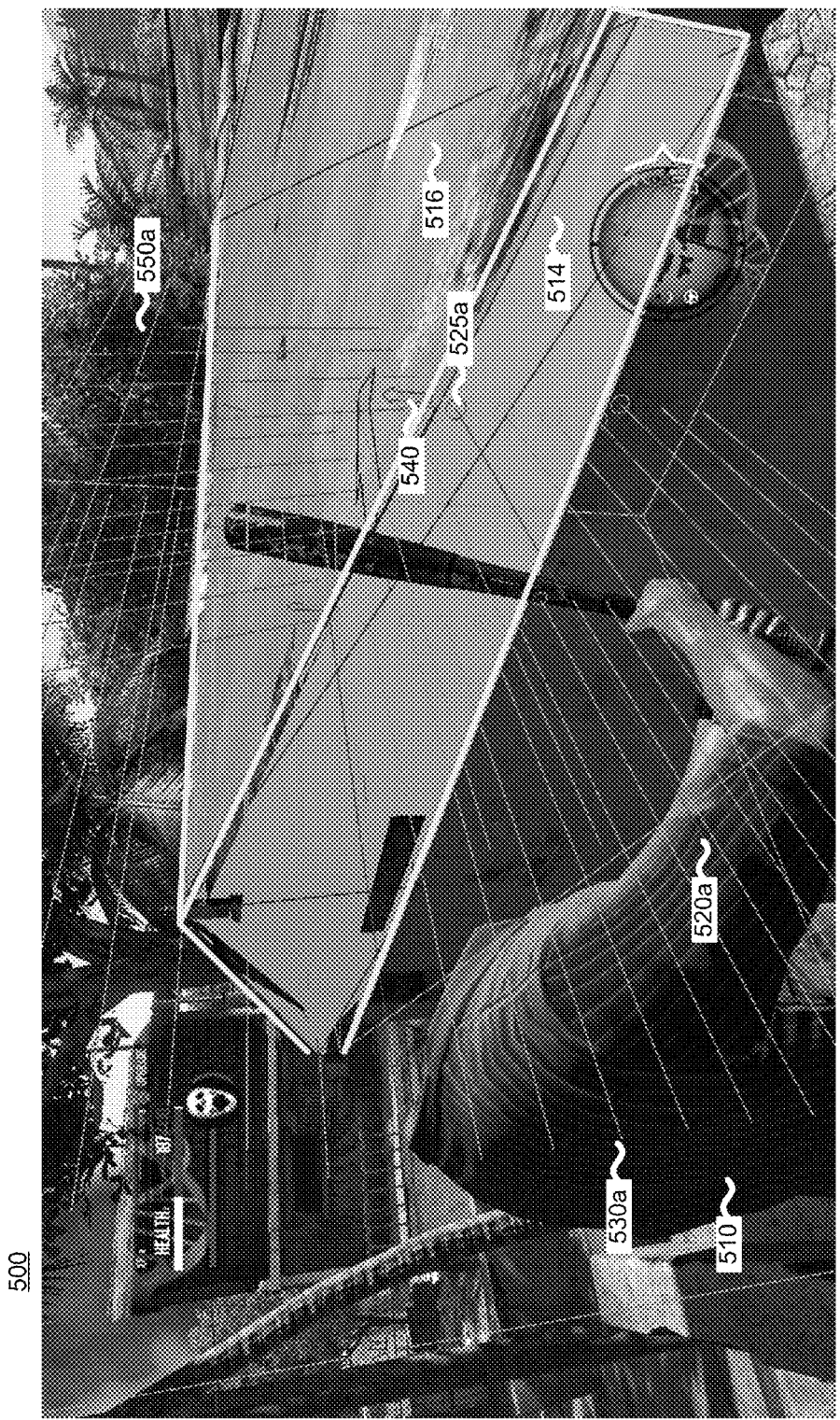
FIG. 5 depicts an example complex virtual environment in accordance with one or more illustrative aspects discussed herein.

FIGS. 4A and 4B illustrate a simplified virtual environment along with representations of the ray tracing operations used to detect and analyze movement hooks in the virtual environment. FIG. 5 provides an example of one implementation of some aspects discussed in regard to FIG. 4A.

FIG. 5 illustrates an example virtual environment 500 according to one or more aspects disclosed herein. In the example presented in FIG. 5, virtual environment 500 may represent a village having a variety of structures and objects throughout. Player 510 may navigate through virtual environment 500 using one or more techniques described herein. Player 510 is illustrated as standing in front of a structure having front surface 514 and top surface 516. A plurality of left side ray traces such as ray trace 530a are executed starting from positions along a left side of player 510. A plurality of right side ray traces such as ray trace 520a are executed starting from positions along a right side of player 510. One of the right side ray traces may collide with front surface 514 at collision point 525a. One or more vertical ray traces 540 may be executed to verify that collision point 525a is associated with an edge in virtual environment 500. When vertical ray trace 540 collides with top surface 516, the application determines that collision point 525a is associated with an edge and may generate one or more movement hooks using collision point 525a as a right side point. As further illustrated in FIG. 5, one or more additional vertical ray traces such as ray trace 550a may be used to determine how the player may interact with the geometry, such as whether it is possible to place the player on the edge geometry after the player climbs up.

FIG. 5 illustrates a view of the virtual environment from an over-the-shoulder point of view relative to the player. The virtual environment may be presented to the user through several user interface techniques, such as a first person view, a third person view, an overhead view, and the like.

Having discussed methods of providing natural and dynamic movement as a player move through a virtual environment, as shown in FIGS. 2 and 3, and ray tracing in illustrative virtual environments, as shown in FIGS. 4A, 4B, and 5, discussion will now turn to example computer code which may be used to implement one or more aspects as disclosed herein.

FIGS. 6-9 illustrate example computer code implementing some features of the methods and techniques discussed herein. Numerous and varied changes may be made to the code illustrated in FIGS. 6-9 without departing from the scope of the techniques described herein, and many other implementations of some features and aspects disclosed herein are possible.

FIG. 6 illustrates example computer code for generating and performing a plurality of left side ray traces and right side ray traces. The code of FIG. 6 may generally correspond to steps 302 and 304 of FIG. 3. The code may iterate over both a left side and a ride side of the player. For each side, a start point is determined offset from the player's position in both the x and z directions relative to the player. In one embodiment, the start point may be offset 20 cm behind the player in the z direction, and offset 30 cm to the side of the player in the x direction. The ray traces may be horizontal ray traces and may be performed in the XZ plane relative to the player. The ray traces are fired from the starting point in the XZ plane at y coordinates beginning at a maximum height based on the player's position and iterate down to a minimum height using a step size. In some embodiments, the maximum height may be 2.8 m above the player, and the minimum height may be 20 cm above the player. In some embodiments, the step size may be 10 cm. The ray traces may be executed using an edge detection maximum distance, which in some embodiments may be 1.6 m. The result of each ray trace is stored for additional processing.

FIG. 7 illustrates example code for a ray trace helper function. The ray trace function may check for a collision with geometry in the virtual environment based on an origin point and a direction. If there is a collision, that collision point is returned. Otherwise, a NULL result is returned. Although not illustrated in FIG. 7, the ray trace helper function may also take a maximum distance parameter and may return NULL if no collision exists within that maximum distance.

FIG. 8 illustrates example code for removing invalid collision points. That is, the code illustrated in FIG. 8 determines whether a collision point supports movement interaction and removes the collision point if it does not support movement interaction. The code illustrated in FIG. 8 may generally correspond to step 306 of FIG. 3. For each of the ray traces done on the left side of the player and on the right side of the player, the code steps through each of the stored ray traces to determine if there is an edge associated with a collision point of the ray trace. The code may perform a vertical ray trace starting at an origin point based on the collision point. The origin point may be determined by adding a test y coordinate offset and a test z coordinate offset to the collision point. In some embodiments, the test y coordinate offset may be 10 cm and the test z coordinate offset may be 5 cm. The vertical ray trace may be performed in a downward direction, along the y dimension. If the vertical ray trace does not collide with world geometry, the collision point may be discarded as not associated with an edge in the virtual environment. If the vertical ray trace does collide with world geometry, then the candidate collision point is a potential edge and may be adjusted in the y dimension based on a collision of the vertical ray trace.

After determining whether the collision point is associated with an edge in the virtual environment, the code may determine whether a player can climb at the collision point. The code loops over ray traces above the collision point to determine if there is enough space above the collision point. This may be done for a set maximum number of rays based on a minimum climb height. For each ray above the collision point, the code tests whether a minimum amount of climbing space is available using a dot product in the XZ plane of the ray associated with the collision point and the particular ray above the collision point. If a ray above the collision point does not have sufficient minimum climbing space, the code may determine that the point does not support climbing. In some embodiments, the maximum number of rays may be 12, the minimum climb height may be 1.2 m, and the minimum climbing space may be 80 cm.

The code may determine whether the player can hang below the collision point. The code loops over ray traces below the collision point to determine if there is enough space below the collision point. For each ray below the collision point, the code tests whether a minimum amount of hanging space is available using a dot product in the XZ plane of the ray associated with the collision point and the particular ray below the collision point. This may be done for a maximum number of rays based on a minimum hang height. If a ray below the collision point does not have sufficient minimum hanging space, the code may determine that the point does not support hanging. In some embodiments, the maximum number of rays may be 6, the minimum hang height may be 60 cm, and the minimum hanging space may be 40 cm.

If the collision point does not support at least one of climbing or hanging, the collision point is invalid and set to NULL. If, instead, the collision point supports at least one of hanging or climbing then the collision point remains in the set of candidate points for the left or right side, respectively.

FIG. 9 illustrates example code for creating hook pairs from the valid left collision points and right collision points, scoring the hooks, and selecting the best hook of the hook pairs. The code illustrated in FIG. 9 may generally correspond to steps 308 and 310 of FIG. 3. The code may iterate over each valid point in the set of left side collision points. For each valid right collision point, the code may determine an angle of a vector or line between the two points. If the angle in the XY space is less than a maximum XY angle and the angle in the YZ space is less than a maximum YZ angle, the two points are compatible and a hook is created. A score may be determined for the hook based on a distance between a player position and the center of the hook. The score may include a balancing factor to adjust the weighting of the distance. The score may also be based on an angle between the player's move direction and a direction from the player to the hook, and a normalized dot product may be used to determine the score based on the angle. In some embodiments, the distance balancing factor may be 2.5. The left side point of the hook, the right side point of the hook, and the hook's score are added to a list of candidate hooks. The list of candidate hooks may then be sorted by hook score and the hook having the highest score may be selected as a best hook.

By leveraging various aspects of these techniques and/or other features described in further detail below, an application may provide a user with smooth and natural movement throughout a virtual environment. Interaction hooks may be dynamically detected based on geometry and objects in the virtual environment, and a suitable action may be selected based on the available hooks. Aspects described herein may overcome increasing complexity in virtual worlds and provide a greater freedom of movement to players in the virtual environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining a set of movement hooks in a virtual environment as a player moves through the virtual environment;
   selecting one of the hooks of the set of movement hooks based at least in part on a distance from the player to the one of the hooks, wherein selecting the one of the hooks comprises:
      determining a hook score for each respective hook of the set of movement hooks based at least in part on a distance from the player to the respective hook; and
      selecting the hook having a highest hook score; and
   animating the player to perform a first action relative to an object associated with the selected hook, said first action selected from a plurality of different actions, and wherein selecting the first action is based at least in part on a height of the selected hook relative to the player within the virtual environment.

2. The method of claim 1, wherein determining the set of movement hooks in the virtual environment as the player moves through the virtual environment comprises:
   performing a plurality of three dimensional ray traces from a left side of the player and from a right side of the player to generate left side collision points and right side collision points;
   removing invalid points from the left side collision points and the right side collision points, wherein a particular collision point is an invalid point if it does not satisfy one or more interaction constraints; and
   generating the set of movement hooks by determining compatible pairs of the left side collision points and the right side collision points, wherein a left side collision point is compatible with a right side collision point based on an angle of a line between the left side collision point and the right side collision point.

3. The method of claim 2, wherein the one or more interaction constraints are based at least in part on the plurality of different actions.

4. The method of claim 2, wherein removing the invalid points from the left side collision points and the right side collision points each comprises:
   determining whether a particular collision point is associated with a potential edge in the virtual environment by performing a vertical ray trace from a point above the particular collision point in a downward direction;
   determining whether the player can climb the particular collision point by determining whether there is a minimum climbable space above the particular collision point; and
   determining whether the player can hang from the particular collision point by determining whether there is a minimum hang space below the particular collision point.

5. The method of claim 1, wherein selecting the first action is based at least in part on a jump height attribute associated with the player.

6. The method of claim 1, wherein the first action comprises jumping at least as high as the object in the virtual environment.

7. The method of claim 1, wherein the first action comprises climbing the object or hanging from the object in the virtual environment.

8. The method of claim 1, wherein selecting the first action further comprises:
   determining an available height above the selected hook;
   when the available height is greater than or equal to a first threshold, animating the player to climb the object as the first action; and
   when the available height is less than the first threshold, animating the player to hang from the object as the first action.

9. The method of claim 1, further comprising presenting the virtual environment to a user controlling the player in a first person point of view.

10. A method of detecting a set of movement hooks in a virtual environment as a player moves through the virtual environment, said method comprising:
    performing a plurality of three dimensional ray traces from a left side of the player and from a right side of the player to generate left side collision points and right side collision points;
    removing invalid points from the left side collision points and the right side collision points, wherein a particular collision point is an invalid point if it does not satisfy one or more interaction constraints;
    generating the set of movement hooks by determining compatible pairs of the left side collision points and the right side collision points, wherein a left side collision point is compatible with a right side collision point based on an angle of a line between the left side collision point and the right side collision point;

selecting a first hook of the set of movement hooks as a selected hook based on a hook score of the first hook; and animating the player to perform a movement action relative to an object associated with the selected hook.

11. The method of claim 10, wherein animating the player to perform the movement action comprises:

determining a height of the selected hook relative to a position of the player;

when the height of the selected hook is less than or equal to a first threshold, animating the player to perform a first action relative to an object associated with the selected hook; and when the height of the selected hook is greater than the first threshold, animating the player to perform a second action relative to the object, the second action different from the first action.

12. The method of claim 10, wherein the plurality of three dimensional ray traces comprise horizontal ray traces originating from left origin points on the left side of the player and right origin points on the right side of the player, respectively, and wherein the left origin points and the right origin points are distributed over a range of heights based on the position of the player.

13. The method of claim 10, wherein the plurality of ray traces are performed in a direction associated with a movement direction of the player.

14. The method of claim 10, wherein removing the invalid points from the left side collision points and the right side collision points each comprises:

determining whether a particular collision point is an invalid point by performing a vertical ray trace from a point above the particular collision point in a downward direction.

15. The method of claim 10, wherein the hook score is based at least in part on:

a travel speed attribute associated with the player; or an angle between a movement direction of the player and a direction from the player to the first hook.

16. The method of claim 10, wherein animating the player to perform the movement action is performed in response to receiving user input from a user controlling the player.

17. The method of claim 10, wherein the movement action comprises a wall jump or a wall run on a wall associated with the selected hook.

18. One or more non-transitory computer-readable media having computer-executable instructions stored thereon that, when executed, cause at least one computing device to:

detect a set of movement hooks in a virtual environment as a player moves through the virtual environment;

determine a hook score for each respective hook of the set of movement hooks based at least in part on a distance from the player to the respective hook;

select a hook of the set of movement hooks having a highest hook score; and animate the player to perform a movement action relative to an object associated with the selected hook.

19. The non-transitory computer-readable media of claim 18, wherein detecting the set of movement hooks in the virtual environment as the player moves through the virtual environment comprises:

performing a plurality of three dimensional ray traces from a left side of the player and from a right side of the player to generate left side collision points and right side collision points;

removing invalid points from the left side collision points and the right side collision points, wherein a particular collision point is an invalid point if it does not satisfy one or more interaction constraints; and generating the set of movement hooks by determining compatible pairs of the left side collision points and the right side collision points, wherein a left side collision point is compatible with a right side collision point based on an angle of a line between the left side collision point and the right side collision point.

20. The non-transitory computer-readable media of claim 19, wherein removing the invalid points from the left side collision points and the right side collision points each comprises:

determining whether a particular collision point is an invalid point by performing a vertical ray trace from a point above the particular collision point in a downward direction.

* * * * *